United States Patent [19]

Yamada et al.

[11] Patent Number: 4,849,633

[45] Date of Patent: * Jul. 18, 1989

[54] RADIATION IMAGE ERASE UNIT FOR USE WITH STIMULABLE PHOSPHOR SHEET

[75] Inventors: Sadami Yamada; Yasuhiro Kawai; Ryoichi Yoshimura; Satoshi Arakawa; Terumi Matsuda, all of Ashigarakami, Japan

[73] Assignee: Fuji Photo Film Co., Ltd., Kanagawa, Japan

[*] Notice: The portion of the term of this patent subsequent to Feb. 23, 2005 has been disclaimed.

[21] Appl. No.: 114,976

[22] Filed: Oct. 30, 1987

Related U.S. Application Data

[63] Continuation of Ser. No. 740,459, Jun. 3, 1985.

[30] Foreign Application Priority Data

Jun. 1, 1984 [JP] Japan .................. 59-112532
Jun. 1, 1984 [JP] Japan .................. 59-112533
Jun. 1, 1984 [JP] Japan .................. 59-112534
Mar. 26, 1985 [JP] Japan .................. 60-62935

[51] Int. Cl.$^4$ .................................................. G03C 5/16
[52] U.S. Cl. .............................. 250/327.2; 250/484.1
[58] Field of Search .................... 250/484.1, 327.2

[56] References Cited

U.S. PATENT DOCUMENTS 4,165,463  8/1979  Bowen ...................... 250/372
4,500,783  2/1985  Kato ........................ 250/327.2

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image erase unit for erasing a residual image from a stimulable phosphor sheet with erasure light is disposed in the vicinity of an image read-out unit which converts light emitted from the stimulable phosphor sheet upon stimulation thereof into an electric signal. The radiation image erase unit comprises a box-shaped casing having a slot for passage of the stimulable phosphor sheet therethrough into the casing, and erasure light sources disposed in the casing for emitting the erasure light. A pair of rollers is mounted on the casing adjacent to the slot for introducing the stimulable phosphor sheet into the casing. The casing has reflective inner surfaces for reflecting the erasure light effectively, and a heat radiator for discharging out heat generated by the erasure light sources as they are energized.

16 Claims, 8 Drawing Sheets

RADIATION IMAGE ERASE UNIT FOR USE WITH STIMULABLE PHOSPHOR SHEET

This is a continuation of application Ser. No. 740,459 filed 6-3-85.

BACKGROUND OF THE INVENTION

The present invention relates to a radiation image erase unit for use with a stimulable phosphor sheet, and more particularly to a radiation image erase unit in the system in which a stimulable phosphor sheet with a radiation image stored therein is exposed to stimulating rays, and light is emitted from the stimulable phosphor sheet in proportion to the stored radiation energy and read out by an optical image read-out device for conversion into electric signals representing the radiation image. The radiation image erase unit is arranged such that when the radiation image which remains on the stimulable phosphor sheet after the irradiation image has been read out is to e erased upon exposure to erasure light, the heat radiation from the erasure light source is forcibly discharged out to protect the stimulable phosphor sheet from adverse effects of the heat thereon.

There has in recent years been proposed an radiation image recording and reproducing system in which a radiation image of an object can be produced by using a stimulable phosphor. The stimulable phosphor, when exposed to a radiation such as X-rays, α-rays, β-rays, γ-rays, cathode rays, or ultraviolet rays, stores a part of the energy of the radiation. When the stimulable phosphor exposed to the radiation is exposed to stimulating rays such as visible light, the stimulable phosphor emits light in proportion to the stored energy of the radiation. The radiation image recording and reproducing system employs such a stimulable phosphor. More specifically, the radiation image of an object such as a human body is stored in a sheet having a stimulable phosphor (hereinafter referred to as a "stimulable phosphor sheet" or a "phosphor sheet"), and then the stimulable phosphor sheet is scanned with stimulating rays such as a laser beam to cause the stimulable phosphor sheet to emit light representative of the radiation image. The emitted light is photoelectrically detected and converted to an electric image signal which is processed to reproduce a visible image on a recording medium such as a photographic light-sensitive material or on a display unit such as a cathode ray tube (CRT). The aforesaid radiation image recording and reproducing system is disclosed in Japanese Laid-Open Patent Publication. No. 55-12429 or 56-11395, for example.

The radiation image recording and reproducing system of the type described above is of greater practical advantage than conventional radiographic systems using a combination of an intensifying screen and an X-ray film in that images can be recorded in a wide range of radiation exposure. More specifically, it is known that the amount of light emitted from a stimulable phosphor upon stimulation thereof is proportional in a highly wide range to the amount of radiation to which the stimulable phosphor has been exposed. Therefore, even if the amount of radiation to which the stimulable phosphor is exposed varies widely under various conditions, radiation images free from such exposure variations can be obtained by selecting a suitable read-out gain in the photoelectric transducer for reading and converting the emitted light into an electric signal, and processing the electric signal into a visible image on a recording medium such as photographic light-sensitive material or on a display unit such as a CRT.

The radiation image recording and reproducing system is capable of processing a converted electric signal to produce a visible image on a recording medium or a display unit so that the radiation image can well be observed for diagnostic purpose. In this system, the stimulable phosphor sheet does not serve as a final image recording medium, but as a temporary image storage medium for eventually transferring images to the final recording medium or display unit. Therefore, the stimulable phosphor sheet can be used repeatedly, and is economical and convenient if in repetitive use.

To reuse the stimulable phosphor sheet, the residual radiation energy on the stimulable phosphor sheet after the radiation image has been read out by stimulating rays is discharged by exposure to light having a wavelength within the stimulating wavelength for the stimulable phosphor constituting the stimulable phosphor sheet. The erasure of the irradiation energy from the stimulable phosphor sheet is disclosed in Japanese Laid-Open Patent Publication No. 56-11392 or 56-12599, for example.

More specifically, it is necessary to discharge all of the radiation energy remaining on the stimulable phosphor sheet in order to erase any residual irradiation image. Therefore, the residual image should be completely erased by being exposed to as much intensive light emitted from an erasure light source as possible because if any radiation image remained on the phosphor sheet, it would adversely affect a next radiation image of the object to be stored on the phosphor sheet, and no accurate image would be available of the object.

In order to erase the residual image completely and in a short time from the phosphor sheet with the erasure light, an increased number of erasure light sources and an increased amount of erasure light should be employed to generate intensive erasure light. The increased number of erasure light sources and the increased amount of erasure light however tend to heat the image erasure unit excessively. The image erasure unit, the stimulable phosphor sheet, and surrounding components are therefore liable to be damaged by the heat of the erasure light emitted. In addition, the generation of the intensive erasure light requires a large-size power supply which makes the entire system large in size and which also makes it difficult to maintain and service the system.

If the image erasure unit is to be more compact and installed in a smaller space, the number of light sources for emitting erasure light will be restricted and the amount of erasure light emitted will be reduced. Therefore, the stimulable phosphor sheet carrying a residual image to be erased should remain placed in the image erasure unit for an increased period of time. As a result, the cyclic period in which to use the stimulable phosphor sheet for the storage of an radiation image will be increased.

SUMMARY OF THE INVENTION

It is a primary object of the present invention to provide an radiation image erase unit for erasing a residual radiation image from a stimulable phosphor sheet by exposing the same to erasure light in an radiation image recording and read-out system having an image read-out unit for irradiating stimulable phosphor sheet with stimulating rays to cause the same to emit light representative of the radiation image stored therein, for detecting the light emitted from the stimulable phosphor sheet, and for converting said emitted light photoelectrically to an electric signal, the radiation image erase unit comprising: a casing; erasure light source means disposed in the casing for emitting the erasure light; feeder means for delivering the stimulable phosphor sheet for the casing; and heat radiator means mounted on the casing for forcibly radiating heat out of the casing.

Another object of the present invention is to provide a radiation image erase unit for erasing a residual radiation image from a stimulable phosphor sheet by exposing the same to erasure light in an irradiation image recording and read-out system having an image read-out unit for irradiating stimulable phosphor sheet with stimulating rays to cause the same to emit light representative of the irradiation image stored therein, for detecting the light emitted from the stimulable phosphor sheet, and for converting said emitted light photoelectrically to an electric signal, the radiation image erase unit comprising: the radiation image erase unit comprising: a casing; erasure light source means disposed in the casing for emitting the erasure light; and feeder means for delivering the stimulable phosphor sheet for the casing, the casing having inner panel surfaces for reflecting the light emitted from the erasure light source means.

Still another object of the present invention is to provide a radiation image erase unit for erasing a residual radiation image from a stimulable phosphor sheet by exposing the same to erasure light in a radiation image recording and read-out system having an image read-out unit for irradiating the stimulable phosphor sheet with stimulating rays to cause the same to emit light representative of the radiation image stored therein, for detecting the light emitted from the stimulable phosphor sheet, and for converting said emitted light photoelectrically to an electric signal, the radiation image erase unit comprising: a casing; erasure light source means disposed in the casing for emitting the erasure light; and feeder means for delivering the stimulable phosphor sheet for the casing, the casing having a heat radiating opening defined in at least one panel thereof, and a reflecting plate disposed between the panel and the erasure light source means in confronting relation to the opening.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A radiation image recording and read-out system incorporating therein an image recording unit, an image read-out unit, and an image erase unit of the invention will first be described with reference to FIGS. 1 and 2.

Figure 1:
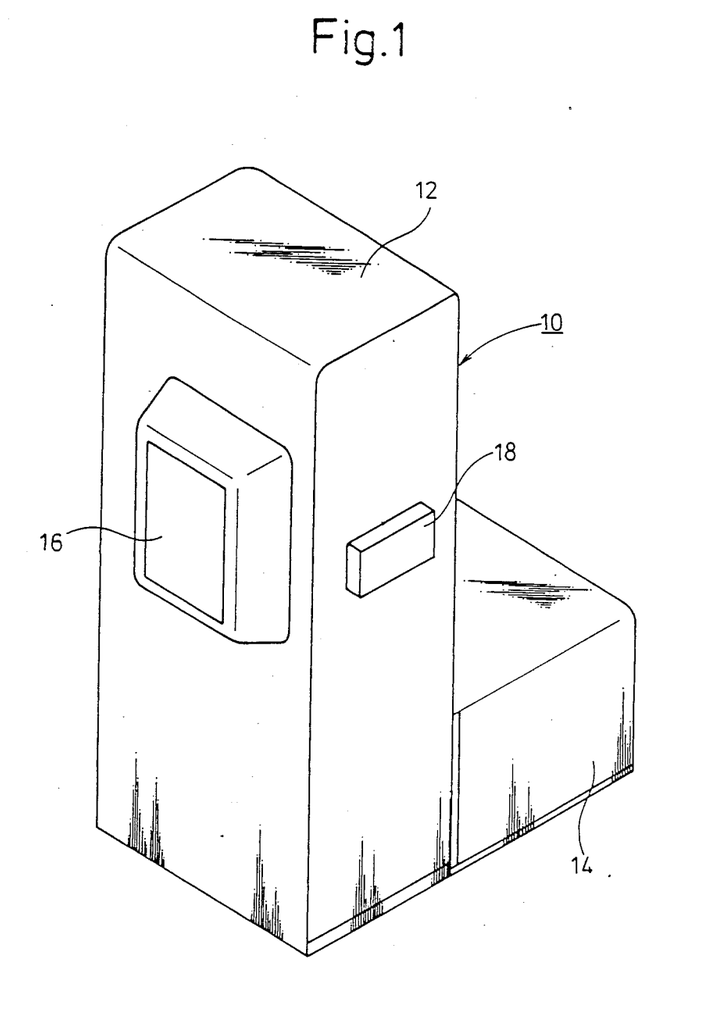
FIG. 1 is a perspective view of a image recording and read-out system.
Figure 2:
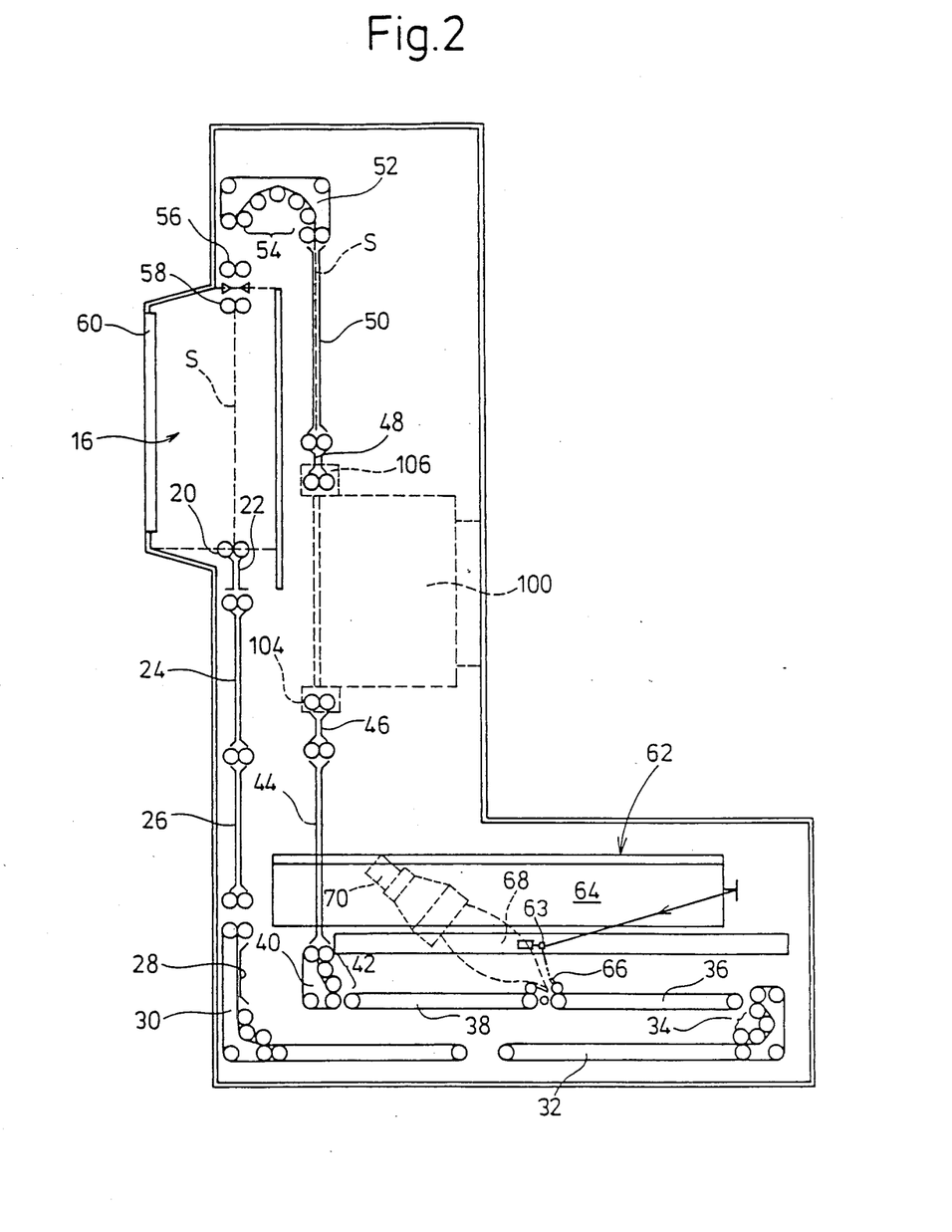
FIG. 2 is a vertical cross-sectional view of the radiation image recording and read-out system shown in FIG. 1.

The reference numeral 10 in FIG. 1 denotes an upstanding radiation image recording and read-out system including a first vertical housing 12 and a second horizontal housing 14. The first housing 12 supports an exposure unit or image recording unit 16 on a front upper portion thereof and a control unit 18 on a side upper wall thereof.

The arrangements in the first and second housings 12, 14 will be described with reference to FIG. 2. A pair of sheet reception rollers 20 for receiving a stimulable phosphor sheet on which an image is recorded is disposed in a lower portion of the image recording unit 16. Below the roller pair 20, there are disposed a first pair of confronting guide members 22 and a second pair of confronting guide members 24, each pair extending in the vertical direction. There is a roller pair disposed between the first and second pairs of guide members 22, 24, respectively. A pair of third confronting guide members 26 is located beneath the first and second pairs of guide members 22, 24 with another roller pair disposed therebetween. Roller pairs are rotatably disposed between the third pair of guide members 26 and a fourth guide member 28 disposed therebelow.

A first endless feed belt 30 is disposed partly against the fourth guide member 28 and has an angularly bent configuration at an inner corner of the first housing 12. The first feed belt 30 terminates at a lower central portion of the second housing 14. A second endless feed belt 32 is disposed in a slightly spaced relation to the terminal end of the first endless feed belt 30. The second endless feed belt 32 is angularly bent in an upward direction at an inner corner of the second housing 14. A group of four rollers 34 is held against the inner bent portion of the, second feed belt 32. Third and fourth successively positioned endless feed belts 36, 38, respectively, extend horizontally with the third belt 36 in slightly spaced relation to the terminal end of the feed belt 32. A fifth endless belt 40 bent upwardly is located in the vicinity of the terminal end of the fourth feed belt 38. A group of three rollers 42 is held against a surface of the belt 40.

The fifth belt 40 and the roller group 42 are located beneath a pair of confronting guide members 44 disposed below a pair of confronting guide members 46 with a pair of confronting rollers interposed therebetween. Above the guide members 46, there is positioned a radiation image erase unit 100 of the present invention which will be described in detail later on. Relatively short guide members 48 are disposed above the radiation image erase unit 100, and other guide members 50 are located above the guide members 48. An endless feed belt 52 of a bent configuration is disposed in the vicinity of the terminal ends of the guide members 50 in a substantially top portion of the first housing 12. A roller group 54 is held against a curved inner run of the feed belt 52. Below the feed belt 52 and the roller group 54, there are disposed two pairs of rollers 56, 58 for supplying a stimulable phosphor sheet into the image recording unit 16.

The feed system for a stimulable phosphor sheet has the above basic construction in the radiation image recording and read-out system 10.

The image read-out unit, designated at 62, positioned in relation to the feed system will be described.

The image read-out unit 62 is basically composed of a laser beam source 64, a scanning optical system 63 including a galvanometer mirror for scanning a laser beam emitted from the laser beam source 64 over a stimulable phosphor sheet, a reflecting mirror 66 for collecting light, and a light collecting optical element 68 for effectively collecting part of light emitted from the stimulable phosphor sheet by the scanning laser beam, and also light reflected by the reflecting mirror 66. A photomultiplier (photoelectric conversion device) 70 is mounted on the top of the light collecting optical element 68.

Figure 3:
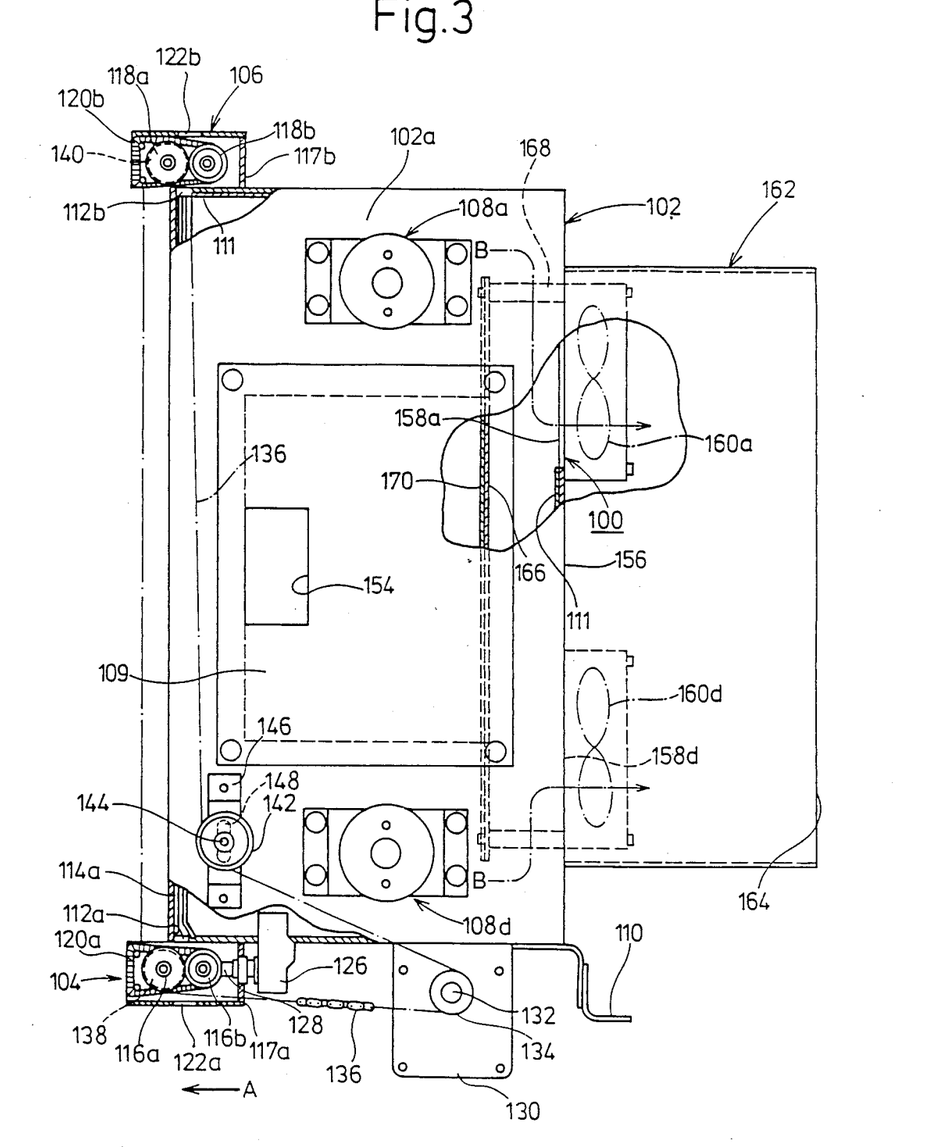
FIG. 3 is an enlarged vertical cross-sectional view of a radiation image erase unit for a stimulable phosphor sheet according to the present invention.

The radiation image erase unit 100 according to the present invention is shown in detail in FIG. 3. The radiation image erase unit 100 essentially comprises a casing 102, a pair of feeders 104, 106 mounted on the lower and upper ends, respectively, of the casing 102, and first through fourth light sources 108a through 108d (FIG. 5) for emitting erasure light into the casing 102. The light sources 108a, 108d are mounted on a side panel 102a of the casing 102 and widely spaced from each other in parallel relation, while the light sources 108b, 108c are mounted on an opposite side panel 102b of the casing 102 and closely spaced from each other in parallel relation. Thus, the light sources 108b, 108c are located vertically between the light sources 108a, 108d. The side panel 102a has a large service opening which is closed by an openable cover 109 fastened as by screws to the side panel 102a. An angle member 110 is fixed to the lower end of the casing 102. The casing 102 can be fixed to the first housing 12 by attaching the angle member 110 to the first housing 12.

Figure 5:
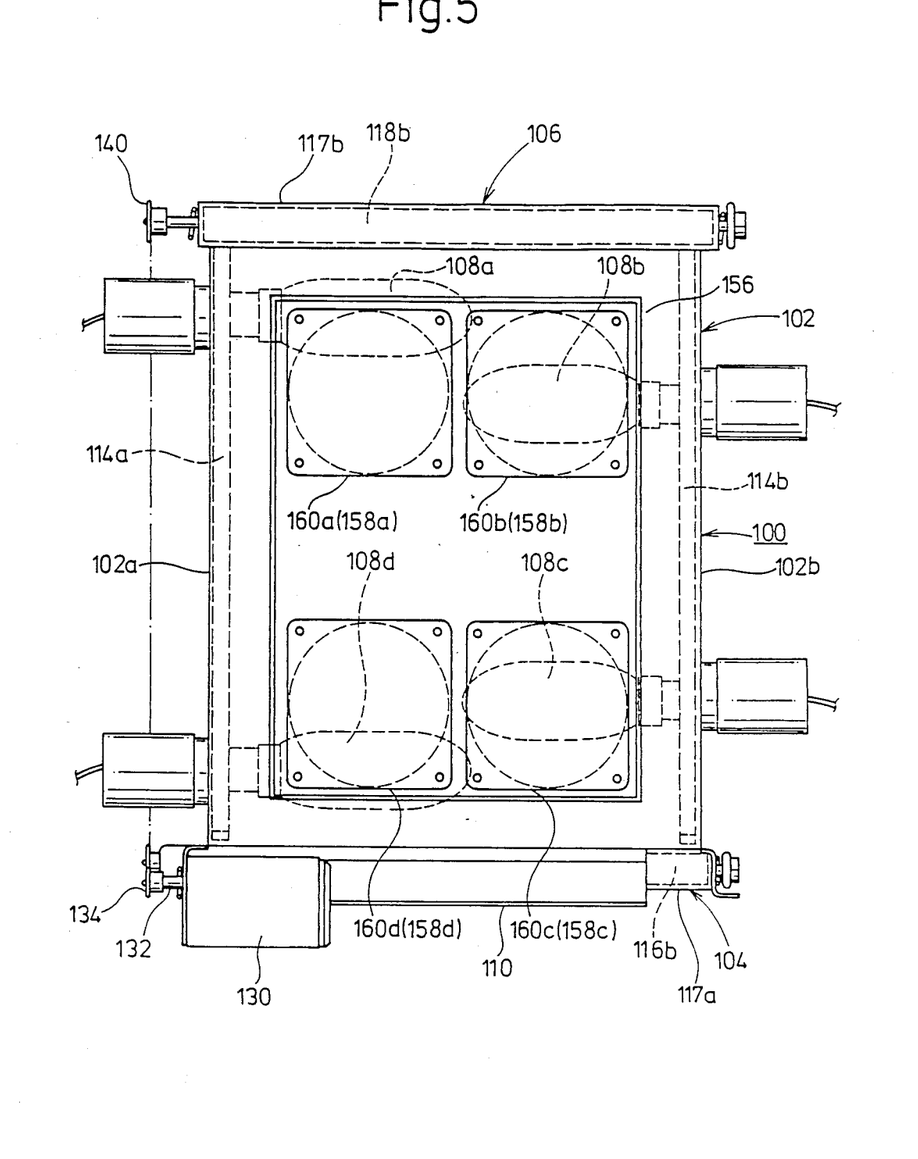
FIG. 5 is a side elevational view of the radiation image erase unit shown in FIG. 3.
Figure 6:
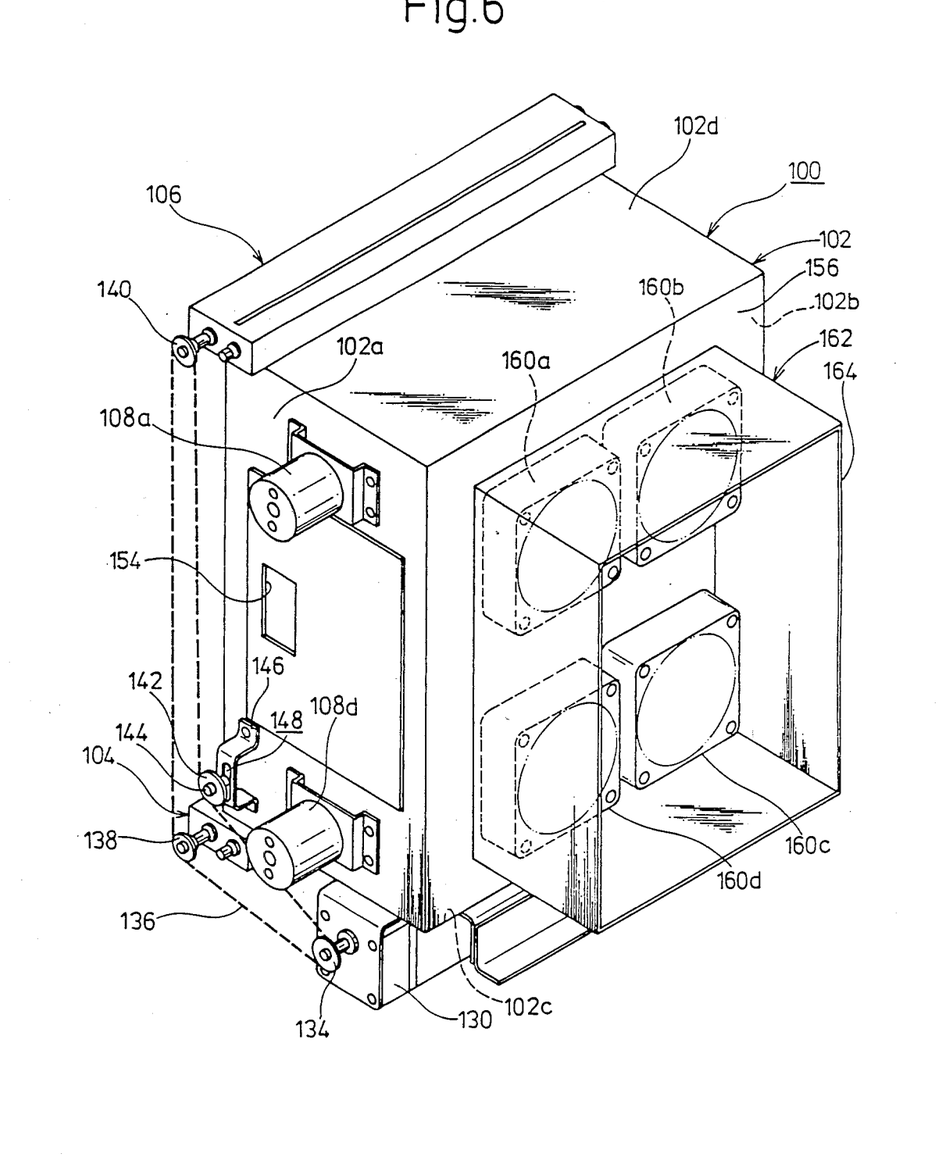
FIG. 6 is a perspective view of the radiation image erase unit shown in FIG. 3.

The casing 102 has inlet and outlet slots 112a, 112b defined in upper and lower panels thereof adjacent to the feeders 104, 106, respectively. Guide members 114a, 114b are disposed in parallel relation in the casing 102 and extend from the inlet slot 112a to the outlet slot 112b as shown in FIG. 5. The feeder 104 is composed of a pair of nip rollers 116a, 116b held in rolling contact with each other and enclosed in a first cover 117a attached to the lower panel of the casing 102. Likewise, the feeder 106 is composed of a pair of nip rollers 118a, 118b held in rolling contact with each other and enclosed in a second cover 117b attached to the upper panel of the casing 102. Resilient members 120a, 120b such as coil springs are engaged by pins attached to the covers 117a, 117b, respectively, and held in engagement with the rotatable shafts of the nip rollers 116b, 118b for normally urging them to be forcibly pressed against the nip rollers 116a, 118a, respectively. The covers 117a, 117b have slots 122a, 122b, respectively, aligned with the inlet and outlet slots 112a, 112b, respectively.

As shown in FIG. 3, a microswitch 126 is mounted on the casing 102 to function as a limit switch and has a detecting arm 128 held in sliding contact with the nip roller 116b. A motor 130 is fixed to the casing 102 closely to the angle 110 and has a rotatable shaft 132 to which a first sprocket 134 is fixed. A chain 136 is trained around the first sprocket 134, a second sprocket 138 fixed coaxially to the nip roller 116a, and a third sprocket 140 fixed coaxially to the nip roller 118a. The chain 136 is also trained around a fourth tensioning sprocket 142 rotatably mounted on the side panel 102a of the casing 102. The fourth sprocket 142 is supported on a shaft 144 displaceable in a slot 148 defined in a holder 146 attached to the side panel 102a for giving the chain 136 an optimum tension.

The radiation image erase unit 100 includes a heat radiator for forcibly cooling the casing 102. As shown in FIGS. 3, 5, 6 and 8, the heat radiator is composed of a relatively small opening 154 defined in the cover 109 fastened to the casing 102, a plurality of openings 158a through 158d (four openings in the illustrated embodiment) defined in a side panel 156 of the casing 102 and each larger than the opening 154, and a plurality of motor-driven fans 160a through 160d (four motor-driven fans in the illustrated embodiment) disposed respectively in the openings 158a through 158d and drivable in synchronism with energization of the sources 108a through 108d. A duct 162 of a rectangular cross section is mounted on the side panel 156 in surrounding relation to the openings 158a through 158d and hence the motor-driven fans 160a through 160d. The duct 162 has an opening 164 at its distal end extending through the first housing 12, the opening 164 communicating with the exterior of the radiation image recording and read-out system 10 (FIG. 2). The motor-driven fans 160a through 160d may be mounted on the distal end of the duct 162 disposed out of the system 10, rather than on the side panel 156 over the openings 158a through 158d. The number of motor-driven fans employed may appropriately be selected dependent on the r.p.m. thereof and in view of other considerations.

The side panels 102a through 102d and the side panel 156 of the casing 102 have inner surfaces of a mirror finish. Where the casing 102 is constructed of a metal sheet, it is preferable to grind the inner surfaces of the casing 102 to a mirror finish. However, the casing 102 may be made of any suitable material, and the inner surfaces of the side panels 102a through 102d and the side panel 156 may be coated with thin films 111 of a mirror finish, as illustrated in FIG. 3.

A reflecting plate 166 smaller in area than the side panel 156 is disposed in the casing 102 and mounted on the side panel 156 by bolts 168 threaded at both ends thereof or other fasteners, the reflecting plate 166 being spaced from the inner surface of the side panel 156. The reflecting plate 166 is positioned as closely to the light sources 108a through 108d as possible, and has a surface 170 of a mirror finish which faces the light surfaces 108a through 108d. Alternatively, the surface of the reflecting plate 166 facing the light sources 108a through 108d may be coated with a thin reflecting film or provided with a thin reflecting sheet.

Figure 4:
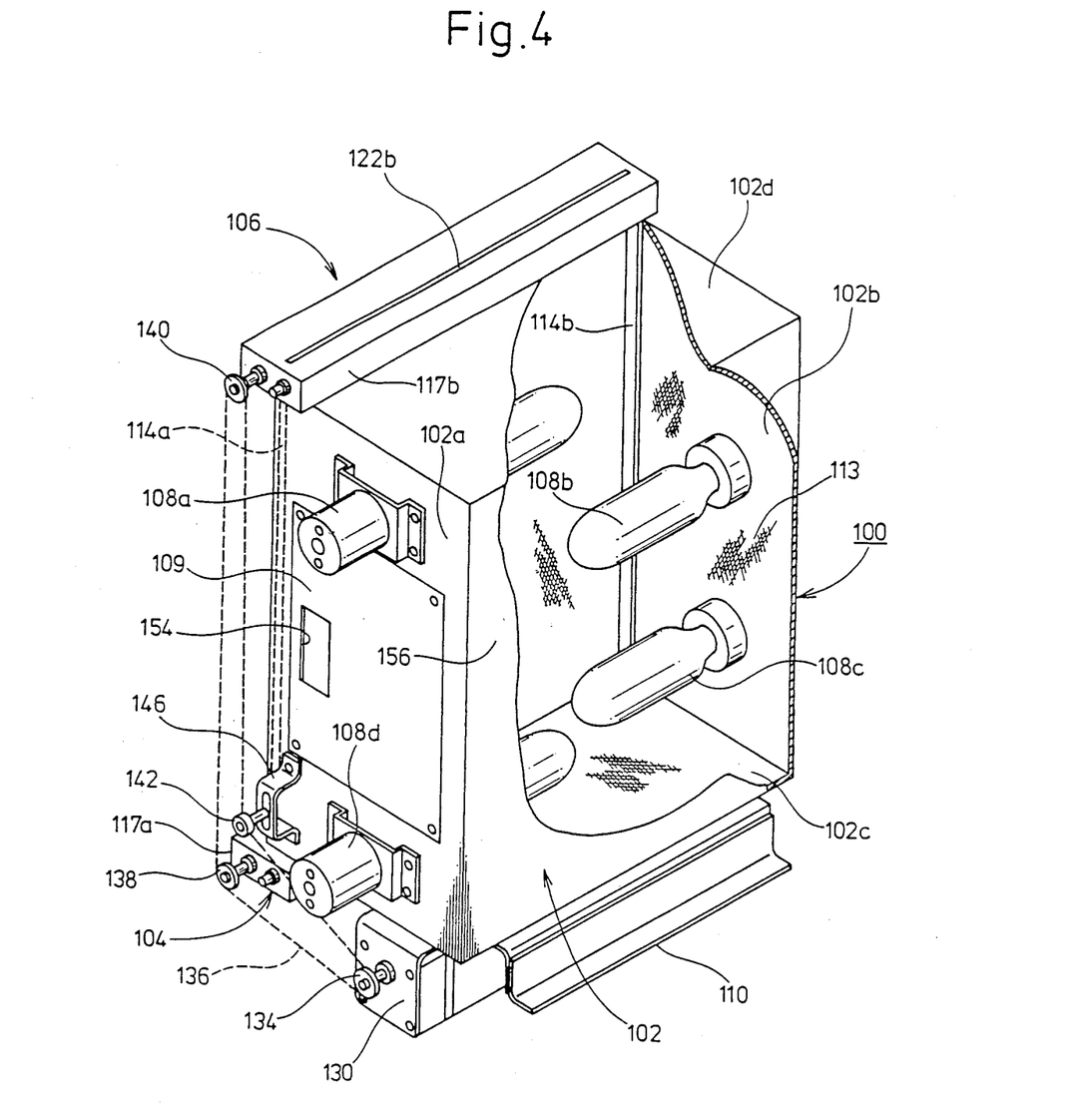
FIG. 4 is a perspective view, partly cut away, of the radiation image erase unit.

The inner wall surfaces 111 of the casing 102 and the reflecting surface 170 of the reflecting plate 166 may also be capable of diffusing light falling thereon. Such a diffusive reflecting surface 113 may be disposed substantially fully over the side panel of the casing 102 which faces the stimulable phosphor sheet in the casing 102. It is preferable however that all of the substantially entire inner surfaces of the side panels of the casing 102 comprise such diffusive reflecting surfaces 113 as shown in FIG. 4.

The diffusive reflecting surfaces 113 may be produced in the casing 102 in various ways. For example, the inner panel surfaces of the casing 102 may be coated with a paint containing a white pigment. As an alternative, panels containing a white pigment may be applied to the inner panel surfaces of the casing 102. Where the inner panel surfaces of the casing 102 are coated with a paint containing a white pigment, it is preferable to coat the paint in a baking finish process. The panel containing a white pigment may comprise a panel with a white pigment paste mixed therein, or a panel composed of a support painted with a white pigment.

The white pigment may be in the form of inorganic white powder or organic white powder. However, the inorganic white powder is preferred for its better heat resistance.

Examples of the inorganic white powder include titanium dioxide, magnesium oxide, basic lead carbonate ($2PbCO_3.Pb(OH)_2$), barium sulfate, aluminum oxide, alkaline earth metal halide (for example, barium fluoro halide such as BaFCl, BaFBr), calcium carbonate, zinc oxide, antimony oxide, silicon dioxide, lithopone, magnesium silicate, basic silicate white lead basic phosphate white lead, and aluminum silicate.

Operation of the radiation image erase unit thus constructed will be described below.

An object (not shown) held against an exposure surface 60 of the image recording unit 16 is exposed to a radiation, and an irradiation image of the object is recorded on a stimulable phosphor sheet S. The stimulable phosphor sheet S is then fed through the rollers 20, the guide members 22, 24, 26, 28, and the endless belts 30, 32, 36 to the image read-out unit 62. In the image read-out unit 62, the stimulable phosphor sheet S is scanned through the scanning optical system 63 by a laser beam emitted from the laser source 64 to emit light which is reflected directly or by the mirror 66 to the optical device 68. The light from the optical device 68 is then converted by the photomultiplier 70 to an electric signal that is fed to an image reproducing unit (not shown).

After the radiation image has been read from the stimulable phosphor sheet S, the stimulable phosphor sheet S is fed by the feed belts 38, 40 through the guide members 44 and the guide members 46 to the nip rollers 116a, 116b. The stimulable phosphor sheet S as introduced into the inlet slot 122a is led by the nip rollers 116a, 116b to the guide members 114a, 114b. When the stimulable phosphor sheet S is pinched between the nip rollers 116a, 116b, the nip roller 116b is displaced by the sheet S away from the nip roller 116a against the tension of the coil spring 120a to push the detecting arm 128 of the microswitch 126. The microswitch 126 then generates a signal to energize the motor 130, whereupon the chain 136 is moved to rotate the second sprocket 138. Since the second sprocket 138 is fixed coaxially to the nip roller 116a, the nip roller 116a is rotated to deliver the stimulable phosphor sheet S toward the guide members 114a, 114b while the nip roller 116b is also being rotated.

As described above, the microswitch 126 is turned on to energize the motor 130 when the stimulable phosphor sheet S reaches the nip roller 116b and displaces the same. Upon rotation of the motor 130, the third sprocket 140 also rotates the nip rollers 118a, 118b. As the leading end of the stimulable phosphor sheet S moves through the guide members 114a, 114b and reaches the nip rollers 118a, 118b, the trailing end of the stimulable phosphor sheet S leaves the nip rollers 116a, 116b. The nip roller 116b is now displaced in the direction of the arrow A (FIG. 3) toward the nip roller 116a under the resiliency of the coil spring 120a. As a result, the detecting arm 128 of the microswitch 126 is also displaced in the direction of the arrow A, and the microswitch 126 issues a signal to reverse the motor 130. The stimulable phosphor sheet S with its leading end gripped by the nip rollers 118a, 118b is then moved back toward the nip rollers 116a, 116b. When the trailing end of the sheet S is gripped again between the nip rollers 116a, 116b, the nip roller 116b and hence the detecting arm 128 are displaced again to enable the microswitch 126 to issue a signal for de-energizing the motor 130. Now, the stimulable phosphor sheet S is held between the nip rollers 116a, 116b and the nip rollers 118a, 118b.

Figure 7:
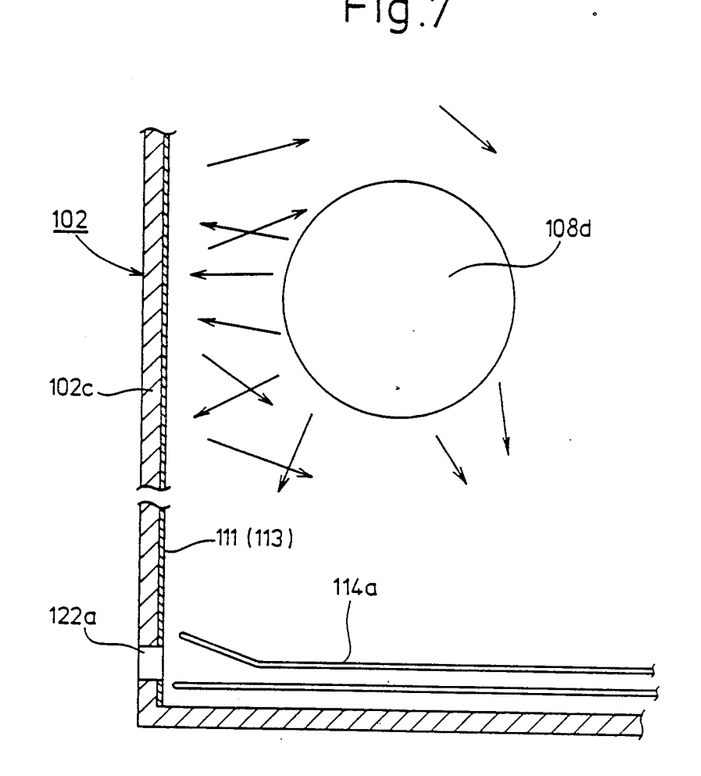
FIG. 7 is a fragmentary view showing the relationship between a mirrored layer or diffusion layer on the inner surface of a casing side wall, a light source, and reflected light.

The light sources 108a, 108b, 108c, and 108d are energized to emit light which is reflected sufficiently back and forth in the casing 102 to erase any residual radiation image from the stimulable phosphor sheet S. More specifically, since the light sources 108a through 108d are disposed parallel to each other, light emitted from the light sources 108a through 108d directly illuminate the surface of the stimulable phosphor sheet S uniformly. Part of the emitted light is reflected by the mirror-finish surfaces 111, 170 or the diffusive reflecting surfaces 113 to fall on the sheet S (see FIG. 7). The residual radiation image can therefore completely be erased from the stimulable phosphor sheet S. The erasure light emitted from the light sources 108a through 108d has a wavelength in the range of stimulating wavelengths of the stimulable phosphor sheet S.

In synchronism with the energization of the light sources 108a through 108d, the motor-driven fans 160a through 160d are actuated to cause hot air heated by the light sources 108a through 108d in the casing 102 to flow in the direction of the arrow B (FIG. 3) into the duct 162 from which the hot air is discharged out of the erase unit 100. At the same time, cool air is introduced by the motor-driven fans 160a through 160d through the opening 154 into the casing 102 which is forcibly cooled by the introduced cool air.

Since the side panel 156 has the holes 158a through 158d for heat radiation, the inner reflecting surface on the side panel 156 has a reduced area which has a low light reflecting capability which would impair the intended function of the erase unit 100. However, the reflecting plate 166 with its inner surface having a mirror finish or diffusive reflecting layer is mounted on the side panel 156 parallel thereto. Therefore, the reflecting surface of a sufficient area is disposed over the holes 158a through 158d to provide a required light reflecting ability. Inasmuch as the reflecting plate 166 is positioned closely to the light sources 108a through 108d, it can reflect intensive erasure light toward the stimulable phosphor sheet S.

A prescribed period of time after the light sources 108a through 108d have been energized, the motor 130 is energized again to move the chain 136 to cause the nip rollers 118a, 118b to feed the stimulable phosphor sheet S toward the guide members 48. Since the residual image is completely erased from the stimulable phosphor sheet S upon arrival at the guide members 48, a next radiation image can well be recorded on and stored in the stimulable phosphor sheet. S which has been delivered into the image recording unit 16 through the endless belt 52 and the rollers 52, 58.

Figure 8:
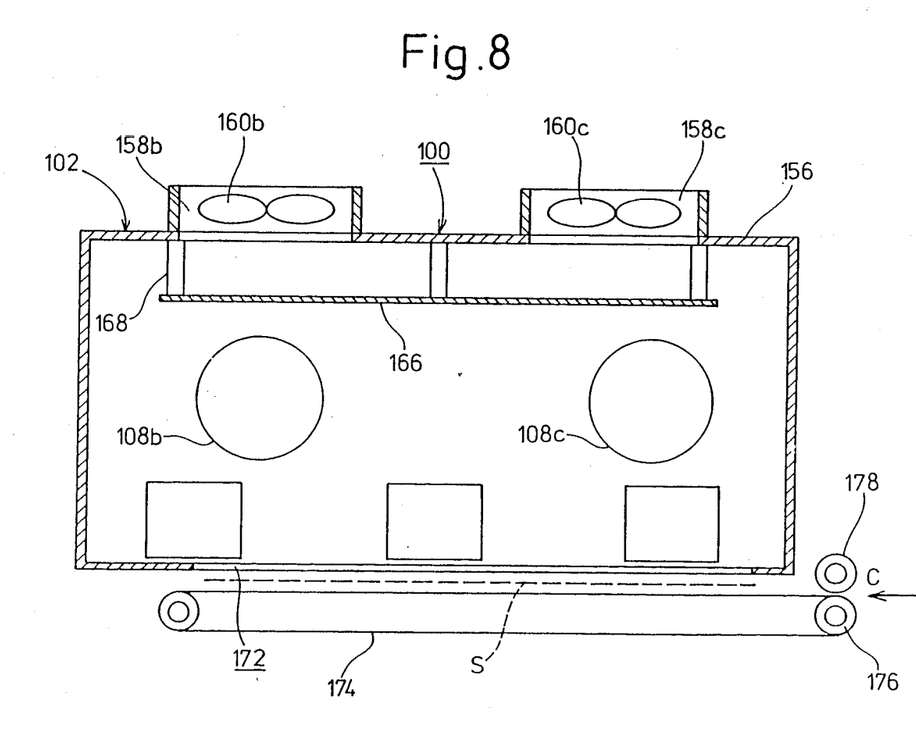
FIG. 8 is a cross-sectional view of a radiation image erase unit according to another embodiment of the present invention.

FIG. 8 shows a radiation image erase unit according to another embodiment of the present invention. The radiation image unit of FIG. 8 is separated physically from the image recording unit and the image read-out unit, and is preferably installed independently of such other units. Identical or corresponding parts shown in FIG. 8 are denoted by identical or corresponding reference characters employed in the previous embodiment.

As shown in FIG. 8, the radiation image unit, designated at 100, includes a casing 102 having an opening 172 defined in a side panel thereof, the opening 172 being large enough to allow an image storage portion of a stimulable phosphor sheet S to be sufficiently exposed to erasure light from the light sources 108a through 108d. A feed belt 174 is disposed outside of the casing 100 proximate to the opening 172. The feed belt 174 is driven by a roller 176, and a roller 178 is pressed against the belt 174 in alignment with the roller 176. The casing 100 has inner panel surfaces which are of a mirror finish or coated with a thin film or sheet of a mirror finish, or which comprise diffusive surfaces. A reflecting plate 166 is mounted in the casing 100 and supported by bolts 168 on a side panel 156 in parallel spaced relation thereto for optically shielding holes 158a through 158d from the erasure light sources 108a through 108d.

When the stimulable phosphor sheet S is fed along in the direction of the arrow C, it is sandwiched between the roller 178 and the feed belt 174 and delivered toward the opening 172. When the sheet S is positioned beneath the opening 172, it is exposed to erasure light emitted from the erasure light sources 108a through 108d to erase any residual image from the sheet S. More specifically, the erasure light from the erasure light sources 108a through 108d falls on the sheet S, directly or through reflection by the mirrored inner panel surfaces of the casing 102 and the mirrored or diffusive surface of the reflecting plate 166. After the residual image has been erased, the feed belt 174 is driven again to feed the sheet S in the direction of the arrow D. With the arrangement of FIG. 8, the radiation image erase unit 100 is not completely shielded against leakage of light therefrom because of the opening 172 which allows the light to leak out. However, since the radiation image erase unit of FIG. 8 is installed independently of and away from the image recording and read-out units, no problem occurs from such a construction. Rather, the radiation image erase unit of FIG. 8 is advantageous in that it can be manufactured inexpensively. The radiation image erase unit can be disposed proximate to the image recording and read-out units if a suitable light shielding member is combined with the radiation image erase unit.

With the arrangement of the present invention, as described above a radiation image erase unit for use with a stimulable phosphor sheet is composed of a casing, feeder means mounted on the casing for feeding a stimulable phosphor sheet, erasure light sources disposed in the casing for emitting light, and a heat radiator on the casing for radiating the heat of the light sources from the casing. The stimulable phosphor sheet and surrounding components are therefore protected from damage due to the heat which would otherwise be trapped in the casing. Since the radiation image unit is in the form of the casing, it can simply be incorporated into a radiation image recording and read-out system, and only takes up a small space so that the system itself can be made compact in size.

The inner panel surfaces of the casing are of a mirror finish or coated with a thin film or sheet of a mirror finish or diffusive nature. The light emitted from the erasure light sources is, directly or through reflection from the inner panel surfaces, directed to the stimulable phosphor sheet to erase any residual radiation image completely from the sheet. Since no residual radiation image remains on the sheet, a next irradiation image can well be recorded and stored in the sheet.

The erase unit also includes a reflecting plate disposed in the casing adjacent to the erasure light sources. The light emitted from the erasure light sources falls, directly or via reflection from the reflecting plate, on the stimulable phosphor sheet for complete erasure of any residual radiation image from the stimulable sheet. The casing has heat radiator holes for radiating heat from the casing, and the reflecting plate is disposed closely to the holes for a light reflecting capability over the holes.

The present invention may be incorporated in a bed-type radiation image recording and read-out system, a radiation image read-out system having an image read-out unit and an image erase unit and separated from an image recording unit, or a radiation image erase unit independent of an image read-out unit and an image recording unit for the sole purpose of erasing residual radiation images.

Although certain preferred embodiments have been shown and described, it should be understood that many changes and modifications may be made therein without departing from the scope of the appended claims.

What is claimed is:

1. A radiation image erase unit (100) for erasing a residual radiation image from a stimulable phosphor sheet by exposing the sheet to erasure light in a radiation image recording and read-out system having an image read-out unit (62) for irradiating the stimulable phosphor sheet with stimulating rays to cause the sheet to emit light representative of said image stored therein, for detecting said light emitted from said stimulable phosphor sheet, and for converting said emitted light photoelectrically into an electric signal, said radiation image erase unit comprising: a casing (!02); erasure light source means (108) disposed in said casing for emitting the erasure light; feeder means (104) for delivering said stimulable phosphor sheet into said casing; and heat radiator means (160) mounted on said casing for forcibly radiating heat out of said casing to directly or indirectly cool said sheet.

2. A radiation image erase unit according to claim 1, wherein said heat radiator means includes openings (154,158) defined in at least two different side panels (102a,156) of said casing, and at least one motor-driven fan (160) disposed over the opening (158) in one (156) of said side panels.

3. A radiation image erase unit according to claim 2, including a plurality of openings defined in said one side panel, a plurality of motor-driven fans disposed over said plurality of openings, and a duct (162) mounted on said one side panel in surrounding relation to said plurality of openings.

4. A radiation image erase unit according to claim 1, wherein said heat radiator means comprises openings defined in a side panel of said casing, a duct mounted on said casing in communication with said openings, and a motor-driven fan mounted on said duct at an outer distal end thereof.

5. A radiation image erase unit for erasing a residual radiation image from a stimulable phosphor sheet by exposing the sheet to erasure light in a radiation image recording and read-out system having an image read-out unit for irradiating said stimulable phosphor sheet with stimulating rays to cause the sheet to emit light representative of said radiation image stored therein, for detecting said light emitted from said stimulable phosphor sheet, and for converting said emitted light photoelectrically into an electric signal, said radiation image erase unit comprising: a casing; erasure light source means disposed in said casing for emitting the erasure light; and feeder means for delivering said stimulable phosphor sheet into said casing, said casing having inner panel surfaces (111) for reflecting the light emitted from said erasure light source means toward said sheet.

6. A radiation image erase unit according to claim 5, wherein each of said inner panel surfaces is of a mirror finish.

7. A radiation image erase unit according to claim 5, wherein each of said inner panel surfaces comprises a reflecting film or sheet of a mirror finish attached to one of panels of said casing.

8. A radiation image erase unit according to claim 5, wherein said casing has a diffusive reflecting surface (113) in at least a portion thereof.

9. A radiation image erase unit according to claim 8, wherein said diffusive reflecting surface lies substantially fully over an inner panel surface of said casing which faces said stimulable phosphor sheet positioned in said casing.

10. A radiation image erase unit according to claim 9, wherein said diffusive reflecting surfaces lies substantially fully over all inner panel surfaces of said casing.

11. A radiation image erase unit according to claim 9, wherein said diffusive reflecting surface is formed of a paint containing a white pigment and coated on said inner panel surface of the casing.

12. A radiation image erase unit according to claim 8, wherein said diffusive reflecting surface is constructed of a panel containing a white pigment and attached to said inner panel surface of said casing.

13. A radiation image erase unit according to claim 11 or 12, wherein said white pigment comprises inorganic white powder.

14. A radiation image erase unit according to claim 13, wherein said inorganic white powder is made of at least one material selected from the group consisting of titanium dioxide, magnesium oxide, basic lead carbonate, barium sulfate, aluminum oxide, alkaline earth metal halide, calcium carbonate, zinc oxide, antimony oxide, silicon dioxide, lithopone, magnesium silicate, basic silicate white lead, basic phosphate white lead, and aluminum silicate.

15. A radiation image erase unit according to claim 5, wherein said erasure light source means comprises at least two erasure light sources disposed in confronting relation to said stimulable phosphor sheet delivered into and positioned in said casing.

16. A radiation image erase unit according to claim 5, wherein said casing has a service opening defined in a panel (156) thereof, and an openable cover (109) attached to said panel in covering relation to said service opening.

* * * * *